July 29, 1969  H. VERDIER  3,457,981
PNEUMATIC TIRES
Filed July 21, 1966
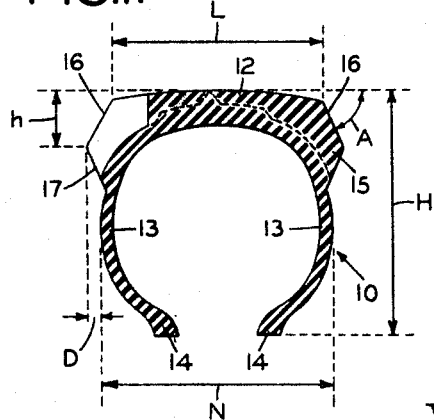
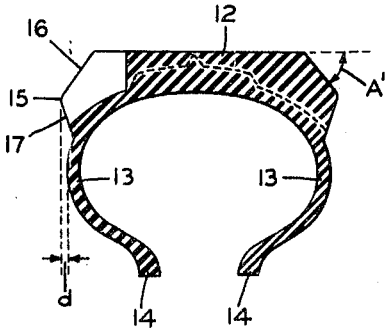
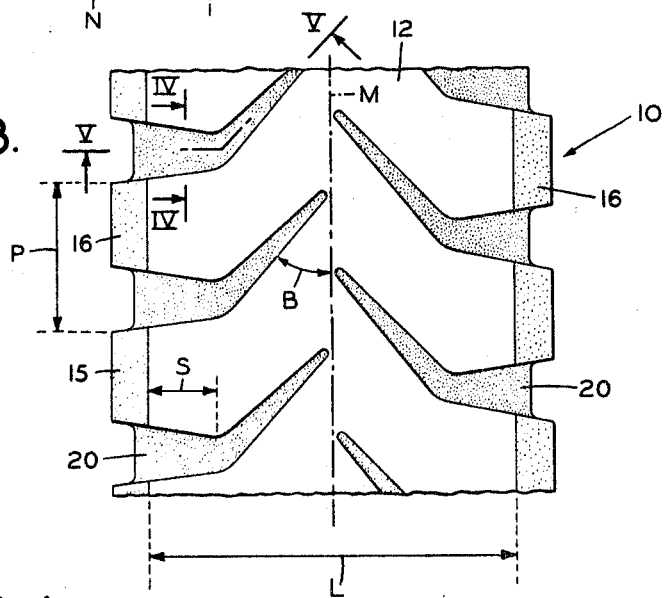
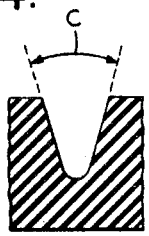
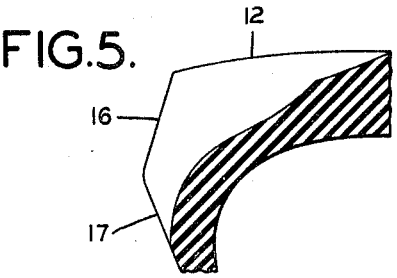
INVENTOR
HENRI VERDIER
BY
HIS ATTORNEYS

United States Patent Office 3,457,981
Patented July 29, 1969

3,457,981
PNEUMATIC TIRES
Henri Verdier, Beauregard L'Eveque, France, assignor to Compagnie Generale des Etablissements Michelin, raison sociale Michelin & Cie, Clermont-Ferrand, Puy-de-Dome, France
Filed July 21, 1966, Ser. No. 566,867
Claims priority, application France, July 31, 1965, 26,853
Int. Cl. B60c 11/00, 27/00
U.S. Cl. 152—209   5 Claims

ABSTRACT OF THE DISCLOSURE

A pneumatic tire is provided having a tread, sidewalls extending inwardly from opposite edges of the tread, and beads at the inner edges of the sidewalls. The tire comprises an annular ridge substantially at the junction of the tread and at least one sidewall and extending laterally beyond the axially outermost portion of such sidewall in both the loaded and unloaded conditions of the tire. The ridge has a radially outer surface inclined at an angle between about 60° and 80° to the axis of the tire when the tire is unloaded and about 50° and 70° when the tire is under load.

---

The present invention refers to improvements in tires, and more particularly to tires for earth-movers and other off-highway vehicles operating on rough or rocky terrain, such as quarries and building sites.

Tires used on off-highway vehicles and equipment operating on rough and rocky terrain are subjected to particularly severe service conditions which cause rapid deterioration of the tread as well as frequent damage to the sidewalls by abrasion, cutting or puncturing.

The present invention relates to a tire structure which has improved wear and damage resistance under difficult service conditions.

The tire casing which may be of the tube or tubeless type includes on at least one side, in the region of the junction of a sidewall and the tread, a ridge projecting laterally from the sidewall, with the radially outer surface of this ridge forming an angle of 60° to 80° with respect to the axis of the tire. The ridge projects outwardly beyond the sidewall, even under the heaviest loading and crushing conditions of the tire to prevent contact of the sidewall with and damage by stones or other obstacles that might otherwise strike the sidewalls of the tire. Furthermore, the inclination of the outer surface of the ridge enables the tire on contact with a rock, either to push the rock back or, if the rock is too heavy or if it is embedded in the ground, to deflect the tire so that it passes by the rock without striking the sidewall.

The material or materials forming the ridge are chosen from among the elastomers with good resistance to abrasion, cutting and puncturing, such as the elastomers used for manufacture of treads. The ridge can also be reinforced with plies, for example, plies of metal cords or cables.

It is preferable that the ridge be adjacent to and forming a part of the tread to enable it to be provided with the tread grooves and blocks of the tread. The part of the ridge projecting furthest laterally should be placed for optimum effect, at about one-fourth of the height of the section of the tire measured from the rolling surface. Preferably, the maximum projection on either side of the tire is limited to about 10% of the nominal width of the tire casing measured while the tire is not under load and is not compressed so as to enable the casing to be kept within the proper dimensions for use on existing vehicles. If the ridge is on one side of the tire only, this side will correspond to the outer side of the wheel.

An important factor in proper functioning of the tire is the angle of the surface of the ridge facing the ground. If this angle is too small, the tire will have a tendency to roll over any stone or obstacle in its way. If the angle is close to a right angle, the tire will not deflect the obstacle away or cause the tire to shift away from it laterally, and thus, passing over or close to an obstacle the tire will be abraded or injured more or less deeply. With a suitable angle greater than 45° but less than 90°, the lateral component of force will be sufficient to prevent contact of the sidewall or sidewalls of the tire and the obstacle, and in many instances, to avoid damage which might otherwise occur. A suitable angle is 60° to 80° on a tire not under load and not compressed so that, when the tire is under load, this angle assumes a value of about 50° to 70°.

Further, in accordance with the invention, the above-described ridged sidewall profile is provided with a tread having a novel groove and cleat pattern which is particularly suitable for off-highway use. The tread in accordance with the invention comprises grooves which are not connected to each other and extend over approximately half of the width of the tread. These grooves have their outer ends disposed substantially transversely of the tread and their inner end portions inclined obliquely at an angle of about 40° to 60° to the median plane of the tire and having a width and depth which increase from the center towards the edge and a pitch ranging from approximately one-third to one-half of the width of the tread, with the total surface area of the cutouts not exceeding 25% of the surface area of the tread.

The cross-section of the grooves is such as to form a V, the angle of which is approximately 30° so as to avoid retention of stones and facilitate their ejection. The oblique portions of the cutouts on both sides of the longitudinal median plane of the tire may be symmetrical with respect to such plane or they may be parallel with one another.

Such grooves have the desirable characteristic of occupying only a small fraction of the surface of the tread and of occupying surface space in the tread which becomes increasingly smaller the closer the grooves come to the center of the tread. Thus, the tread approaches the structure of the tire with a smooth surface tread close to the centermost portion of the tread enabling satisfactory operation on the highway. Moreover, the groove and cleat structure is favorable for running over rough or rocky ground while supplying the needed traction when the tire is being subjected to longitudinal or transversely directed stresses. The grooves are deeper at the lateral edges of the tread and ridge and provide traction at the outer edges of the tread and across the ridge.

For a better understanding of the invention, reference may be had to the accompanying drawings, in which FIGURE 1 is a view in cross-section of a tire embodying the invention which is not subjected to a load; and FIGURE 2 is a cross-sectional view thereof, showing the tire when it carries the maximum normal load;

FIGURE 3 is a plan view of a development of a part of the tread with grooves and cleats in accordance with the invention;

FIGURE 4 is a cross-sectional view of a section of the tread taken on line IV—IV of FIGURE 3, and FIGURE 5 is a sectional view of a portion of the tread and ridge taken on line V—V of FIGURE 3.

The tire 10 shown in cross-section in FIGURES 1 and 2 includes a tread 12 having a width L and two sidewalls 13 provided with the beads 14 at their inner edges for engaging the rim of a vehicle wheel. The reinforcing plies or carcass of the tire in the sidewalls, the beads and the tread have not been shown inasmuch as they are not necessary for an understanding of the invention.

In accordance with the invention, at the outer edge portion of each of the sidewalls 13 is a ridge or drop-off 15 projecting laterally beyond the sidewall. The zone of greatest lateral projection of the ridge is located at a distance $h$ measured from the peak of the tire equalling approximately one-fourth of the total coss-section height H of the tie. The radially outermost surface 16 of the ridge 15 forms with the transversal direction, i.e., with the ground if it is horiontal, or the axis of the tire, an angle A which, if the tire is not under load (FIGURE 1) is 65°. If the tire is under its rated load, this angle becomes the angle A' (FIGURE 2) with a value of less than 65°.

The ridge 15 has a radially inner surface 17 merging into the sidewall 13 and forming with the transversal direction or the axis of the tire an angle of the same magnitude as the angle A, e.g., 60° to 80°. The ridge formed by these surfaces extends outwardly a distance D (FIGURE 1) which, in this example, is approximately 8% of the nominal width N of the tire. If the tire is compressed radially under its maximum load as shown in FIGURE 2, the distance becomes $d$, which is smaller than D.

The tread 12 comprises grooves 20, which do not occupy more than approximately 25% of the total surface area of the tread. In acocrdance with the invention, each groove extends about half of the width L of the tread, following first a generally transverse path between the edge of the tread and a point at a distance S which, in this example, equals approximately 18% of L, after which the path of the moulding forms an angle B of approximately 50° with the longitudinal median plane M of the tire. The width and the depth of the grooves as shown in FIGURES 3 and 5 increase from the median plane to the edge of the tread. In this example, the spacing P of the grooves is approximately 0.4 L and the walls of the grooves converge towards the axis of rotation of the tire at an angle C of approximately 30° as shown in FIGURE 4.

The tread and sidewall structure described above has most beneficial effects in the operation and prolongation of the operating life, of tires of the type described. Substantial protection of the sidewalls against damage is afforded by the ridge or ridges and the tread pattern also provides optimum characteristics for enabling the use of the tires on or off highways. Inasmuch as the center zone of the tread is largely uninterrupted, it can operate smoothly on the highway while the progressively deepening and widening grooves from the center outwardly into the ridges provide sturdy cleats therebetween to afford excellent traction on soft ground.

The embodiment of the invention described above is susceptible to modification without departing from the invention. Thus, the grooves 20 may be at least partially curved between the edge of the tread and the median plane of the tire; they may be symmetrical with respect to such plane, with their oblique portions in one-half of the tread parallel to those located in the other half.

I claim:
1. A pneumatic tire having a tread, sidewalls extending inwardly from opposite edges of said tread and beads at the inner edges of said sidewalls and comprising an annular ridge substantially at the junction of said tread and at least one sidewall and extending laterally beyond the axially outermost portion of said one sidewall in both the loaded and unloaded conditions of said tire, said ridge having a raidally-outer surface the inclination of which is between about 60° and 80° to the axis of said tire when said tire is unloaded and changes to between about 50° and 70° when said tire is under load, said radially-outer surface forming a drop-off with a radially-inner surface by virtue of which an obstruction deflected axially outwardly beyond said radially-outer surface is free to move relative to said tire towards the axis of said tire while avoiding said sidewall.

2. The tire set forth in claim 1 in which said ridge has its laterally greatest dimension spaced from the radially outermost portion of said tread about one-quarter of the cross-sectional height of said tire.

3. The tire set forth in claim 1 in which said ridge extends laterally beyond said outermost portion of said one sidewall when said tire is unloaded approximately 8% to 10% of the width of said tire.

4. The tire set forth in claim 1 comprising a series of grooves in said tread and ridge, said grooves extending inwardly from each side of said tread approximately halfway across said tread and having about an outer one-third of their length substantially perpendicular to the median plane of said tread and their inner two-thirds inclined at an angle between about 40° and 60° to the median plane of said tread.

5. The tire set forth in claim 4 in which the total surface area of said grooves is about 25% of the total surface area of said tread.

References Cited
UNITED STATES PATENTS

| 1,337,660 | 4/1920 | Killen | 152—352 |
| 2,539,617 | 1/1951 | Gestwick | 152—209 |
| D. 117,175 | 10/1939 | Hardman | 152—209 |
| 2,971,552 | 2/1961 | Williams et al. | 152—209 |

FOREIGN PATENTS

| 525,772 | 8/1955 | Italy. |

ARTHUR L. LA POINT, Primary Examiner